United States Patent [19]
Zitkus

[11] 3,868,794
[45] Mar. 4, 1975

[54] METHOD OF FINISHING LASER RODS AND FIXTURES THEREFOR

[75] Inventor: Wayne J. Zitkus, Toledo, Ohio
[73] Assignee: Owens-Illinois, Inc., Toledo, Ohio
[22] Filed: July 16, 1973
[21] Appl. No.: 379,399

[52] U.S. Cl................ 51/216 A, 51/283, 51/290, 51/323, 51/327, 269/43, 269/321 A
[51] Int. Cl........ B24b 1/00, B24b 7/24, B24b 41/06
[58] Field of Search...... 51/281 R, 283, 289 R, 290, 51/323, 327, 277, 216 LP, 216 A, 227 R, 227 H, 229, 240 GB; 269/43, 287, 319, 321 A; 83/15

[56] References Cited
UNITED STATES PATENTS

| | | | |
|---|---|---|---|
| 1,654,936 | 1/1928 | Jones | 51/323 X |
| 2,424,835 | 7/1947 | Luckey | 51/323 |
| 3,023,547 | 3/1962 | Tesche | 51/317 X |
| 3,112,585 | 12/1963 | Middleton | 51/204 |
| 3,112,851 | 12/1963 | Collins | 83/15 X |
| 3,158,968 | 12/1964 | Ness | 51/281 R X |
| 3,216,154 | 11/1965 | Christen | 51/277 |
| 3,763,611 | 10/1973 | Dühring | 51/323 |

*Primary Examiner*—Donald G. Kelly
*Attorney, Agent, or Firm*—Richard B. Dence; E. J. Holler

[57] ABSTRACT

The end surfaces of laser rods are finished to provide the desired rod length, end surface angular orientation, and surface flatness by mounting a plurality of rod blanks in a rigid fixture with the rods having their ends projecting from surfaces of the fixture and their axes disposed at an angle with respect to the adjacent fixture surface corresponding to the desired angular orientation of the end surfaces. The rod ends projecting from a fixture surface are simultaneously finished by initially grinding and finally lapping and polishing the ends in a plane parallel to the surface. The rod ends are prevented from chipping and edge roll is eliminated by bonding a glass sleeve onto the end of the rod blanks and finishing the rods and sleeves simultaneously. A plurality of glass feet, bonded to the fixture surface and finished with the rods, provide a reference for measuring end surface orientation and rod length.

14 Claims, 9 Drawing Figures

METHOD OF FINISHING LASER RODS AND FIXTURES THEREFOR

BACKGROUND OF THE INVENTION

1. Field of the Invention

This invention relates to the finishing of laser rods and more particularly to an improved method of simultaneously finishing the end surfaces of a plurality of laser rods to precision tolerances to thereby greatly reduce the finishing time required for the individual laser rods.

2. Description of the Prior Art

The finishing of the end surfaces of laser rods by the conventional single rod techniques is an extremely slow and tedious, and therefore expensive, process. For example, the average time for finishing a five millimeter by fifty millimeter plano/plano glass laser rod using single rod finishing techniques is approximately 2¼ to 2½ hours, when finishing the end surfaces to a flatness tolerance of 1/10th wave sodium light and end parallelism tolerance of 5 seconds of arc. These very precise tolerances, required of commercial quality laser rods, combined with the tendency of the rod ends to chip and roll under rapid finishing processes, have made it practically impossible to substantially reduce the finishing time for a single rod.

SUMMARY OF THE INVENTION

The rod finishing method of the present invention contemplates the simultaneous finishing of the end surfaces of a plurality of rod blanks releasably held in fixed relation (hereinafter sometimes referred to as bundle finishing). The required precision tolerances are achieved and at the same time the problems of rod end-chipping and edge rolling have been either eliminated or greatly reduced. This is accomplished by mounting a plurality of rod blanks in a rigid metal mounting fixture having a plurality of accurately aligned bores extending therethrough for receiving and supporting a plurality of rod blanks. The bores extend into the fixture from a surface thereof which is disposed at an angle with respect to the longitudinal axes of the bores which corresponds to the desired angular orientation of the laser rod end surfaces. The bores are dimensioned to provide a "slip fit" for the laser rod blanks which are secured, preferably by thermoplastic adhesive, within the respective bores with their ends projecting outwardly from the planar surfaces of the fixture. A plurality of feet, in the form of glass disks, are bonded to the planar surfaces at spaced points thereover, with the glass feet extending outwardly from the fixture surface in the general direction of the rod blank ends. A sleeve in the form of a short section of glass tubing is then secured to the projecting end of each of the rod blanks, preferably by a thermoplastic adhesive such as paraffin, for the purpose of protecting the ends of the rod blanks against chipping and edge roll during the finishing operations.

The fixture with the rod blanks mounted therein is then mounted in a jig and the ends of the rods, the protecting glass sleeves, and the glass feet are simultaneously ground in a plane parallel to the plane surface of the fixture. Both ends of the rods are ground in this manner to produce a rod having a length slightly greater than the maximum length of the finished laser rods. The fixture is then removed from the jig, and the end surfaces are finished to the necessary degree of flatness and end parallelism by hand lapping, using progressively finer abrasives. Rod lengths and end parallelism or angular orientation can readily be measured by measuring and comparing the height of the respective glass feet positioned on the plane surfaces of the fixture. Upon completion of the finishing process, the end protecting sleeves are moved from the rods, and the rods removed from the fixture by any suitable means depending upon the type of adhesive employed.

BRIEF DESCSRIPTION OF THE DRAWINGS

The method of the present invention and the fixture used therein will be readily understood from the description contained herein taken in conjunction with the accompanying drawings, in which.

DESCRIPTION OF THE PREFERRED EMBODIMENTS

Figure 1:
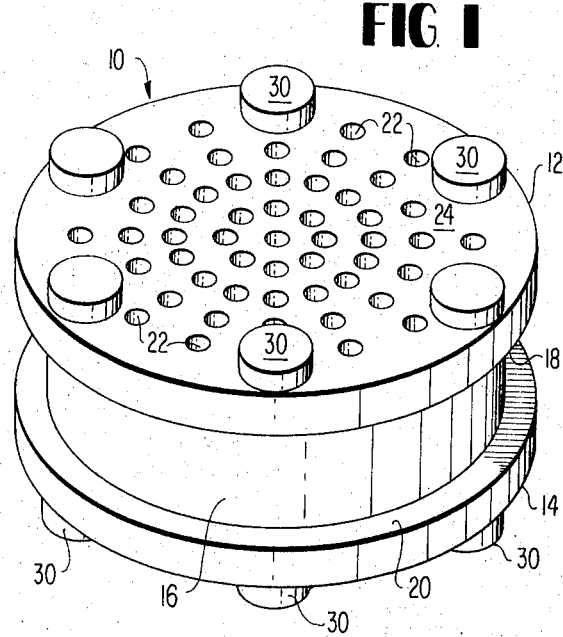
FIG. 1 is a perspective view of a fixture suitable for use in carrying out the method of the present invention.
Figure 2:
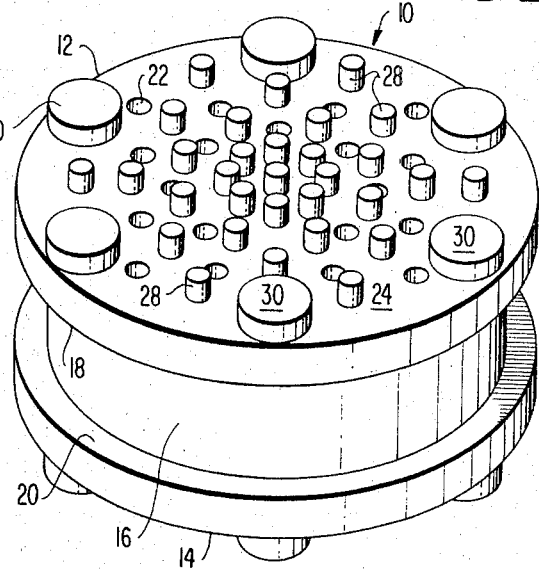
FIG. 2 is a view similar to FIG. 1 and illustrating a plurality of laser rod blanks mounted in the fixture.
Figure 3:
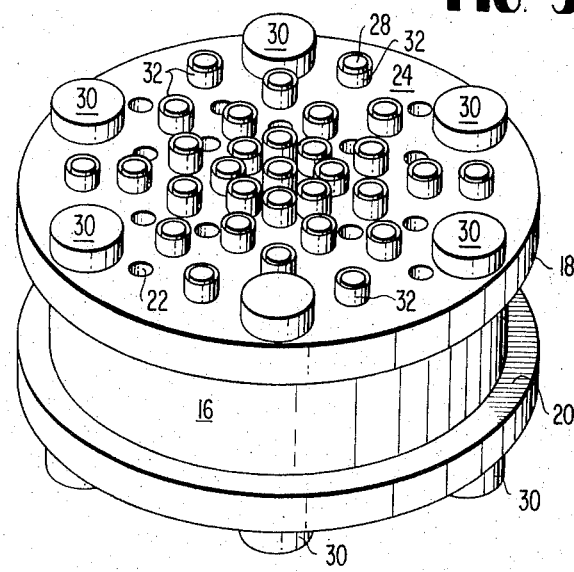
FIG. 3 is a view similar to FIG. 2 illustrating protective glass sleeves mounted on the projecting ends of the laser rods.
Figure 4:
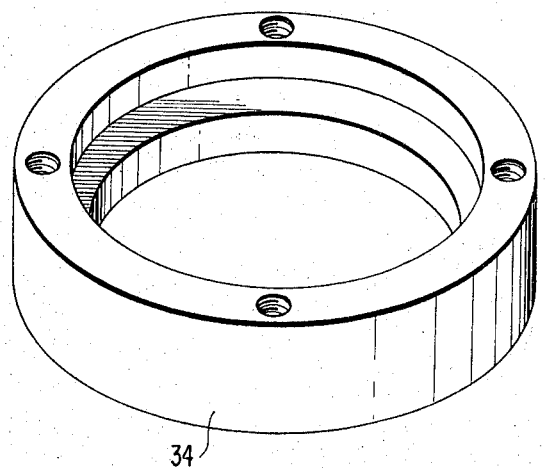
FIG. 4 is a perspective view of a jig suitable for supporting the fixture and laser rods illustrated in FIG. 3.

Referring now to the drawings in detail, a fixture, indicated generally by the reference numeral 10, suitable for carrying out the invention is illustrated as comprising spaced, parallel, upper and lower plates, 12, 14, respectively, preferably made of relatively thick, light weight metal such as aluminum. Plates 12, 14, are rigidly joined, as by welding, to a short cylindrical body 16, also preferably made from a relatively light metal such as aluminum. The construction is such that the assembled plates 12, 14 and the body 16 resembles a spool, or reel, with the peripheral rim portions of end plates 12, 14 extending radially outward beyond the body 16 to form overhanging flanges 18, 20 at each end of the spool. If desired, the body 16 may be formed from a tubular member, whereby the central portion of the fixture is hollow, or alternatively, the entire structure including the top and bottom flanges 12, 14 and the body portion 16 may be machined from a single, solid piece of stock metal.

Parallel bores 22, arrayed in a regular pattern, are formed in and extend axially through the fixture 10, with the axes of the bores 22 extending perpendicular to the face surfaces 24, 26 of top and bottom plates 12, 14, respectively. The axes of bores 22 are mainted parallel within precise tolerances, and their diameters are dimensioned to provide a slip fit for the laser rod blanks 28 to be mounted therein.

A plurality of feet 30 in the form of glass disks are adhesively bonded to the surfaces 24, 26 at spaced intervals around the periphery of flanges 18, 20. The position of the feet 30 is such that conventional caliper micrometers may be employed to measure the height thereof by measuring the combined thickness of the flanges 18, 20 and the glass feet 30 bonded thereon. Thus, during the finishing operation, an indication of the parallelism of the ends of the glass rods being finished in the fixture can be quickly obtained by measuring and comparing the height of the respective glass feet 30 around the periphery of the fixture.

To use the fixture 10, a plurality of laser rod blanks 28, cut approximately ⅛ to ¼ inch oversize in length, are positioned within the openings 22. The metal fixture 10 is then slowly warmed by any suitable means such as an electric "hot air gun" and, with the fixture positioned on its side, paraffin wax is melted and blown around the rod blanks, forming a thin film of molten wax between the surface of the rods 28 in the bores 22 to locate the rods concentrically in the bores. Next, short lengths of glass tubing 32, having an internal diameter dimensioned to provide a "slip fit" over the laser rods, are placed on the projecting ends of the rods, with the glass tubing, or sleeves, 32 resting on the faces 24, 26. The sleeves 32 are then warmed, and paraffin wax is melted and blown into the sleeves, forming a thin film of wax and firmly fixing the sleeves concentrically on the exposed ends of the laser rod blanks. The entire assembly is then allowed to cool so that the paraffin wax firmly fixes the laser rod blanks in position in the fixture, and the sleeves in position on the ends of the laser rod blanks. Since only a thin film of paraffin is employed, the glass sleeves form an effective reinforcing of the rod end to thereby eliminate chipping and edge rolling during finishing of the rods.

Figure 5:
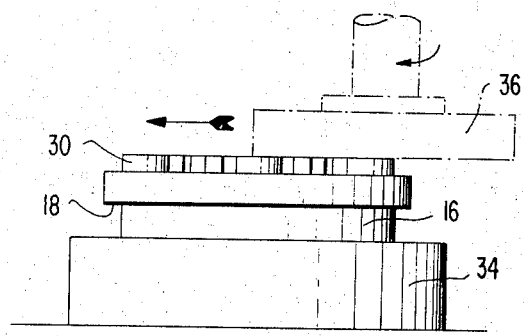
FIG. 5 is an elevation view illustrating the initial step in the finishing process.

Next, the fixture 10, with the laser rod blanks assembled therein, is positioned in a jig 34 and mounted in a surface grinder illustraed in phantom in FIG. 5 and indicated generally by the reference numeral 36. With the assembly held rigidly in place in the surface grinder, the ends of the laser rods 28, the glass sleeves 32, and the glass feet 30 are simultaneously ground to provide uniform surfaces disposed in a plane closely parallel to the plane of the adjacent fixture surface. The fixture is then removed and reversed in the jig 34, replaced in the grinding machine, and the grinding operation repeated. The grinding is continued until the height of the glass feet, as measured by caliper micrometers, indicates that the length of the rod blanks is slightly greater (e.g., 0.008 inches) than the maximum high tolerance for rod length.

After rough grinding in the surface grinder, the fixture 10 with the bundle of laser rod blanks mounted therein is positioned on a lap surface for fining and final polishing, using progressively finer abrasives. During this hand finishing operation on the lap surface, the height of the glass feet are periodically checked with a micrometer to monitor parallelism and sequences of the end faces, and pressure is applied on the lap as indicated by the measurements to correct any minor discrepencies.

After the polishing operation is completed on the lap, the finished bundle of laser rods and the fixture 10 are slowly warmed with a heat gun to melt the paraffin, and the finished rods are pushed out of the fixture. The rods are then cleaned with a suitable solvent such as automotive laquer thinner to dissolve the paraffin from the surface of the rods, and the individual rods are finally checked for length, end surface flatness, and end surface orientation or parallelism.

In an initial trial of the above described process, using inexperienced personnel, a bundle consisting of thirty-one 5 mm × 50 mm plano/plano laser rods were simultaneously finished in a fixture of the type described above. The times for the various operations, and the results of the process were as follows:

| Operation | Time (hours) |
|---|---|
| clean rods | 0.25 |
| mounting rods in fixture | 1.00 |
| rough on surface grinder | 2.00 |
| fine ends ($Al_2O_3$ grit) | 2.75 |
| polish | 4.00 |
| remove rods | 1.00 |
| clean and check rods | 5.00 |
| total | 16.00 |

Final checking of the 31 finished rods revealed that 18 of the 31 were finished within the required precision tolerances mentioned above. Thus, an average of 0.89 hour was required for each of the 18 good rods, as compared to an average of 2.25-2.50 hours required to finish each rod when employing single rod techniques. Further, an analysis of the above operations indicates that the time spent in the initial cleaning, mounting, fining, rod removing, and final cleaning and checking operations could be substantially reduced so that, still assuming 18 good rods for each set of 31 rod blanks finished, the time per good rod completed, with experience, could be reduced to slightly more than ½ hour per rod. Also, additional experience should result in a greater ratio of good completed laser rods to rod blanks in the bundle, which would further reduce the average time per finished laser rod. This prediction for an increased yield of good rods is based primarily on the fact that the majority of the rejected rod blanks, after finishing, were rejected because of the failure to meet the tolerances in end parallelism, which should improve with experience in the hand lapping operation.

Figure 6:
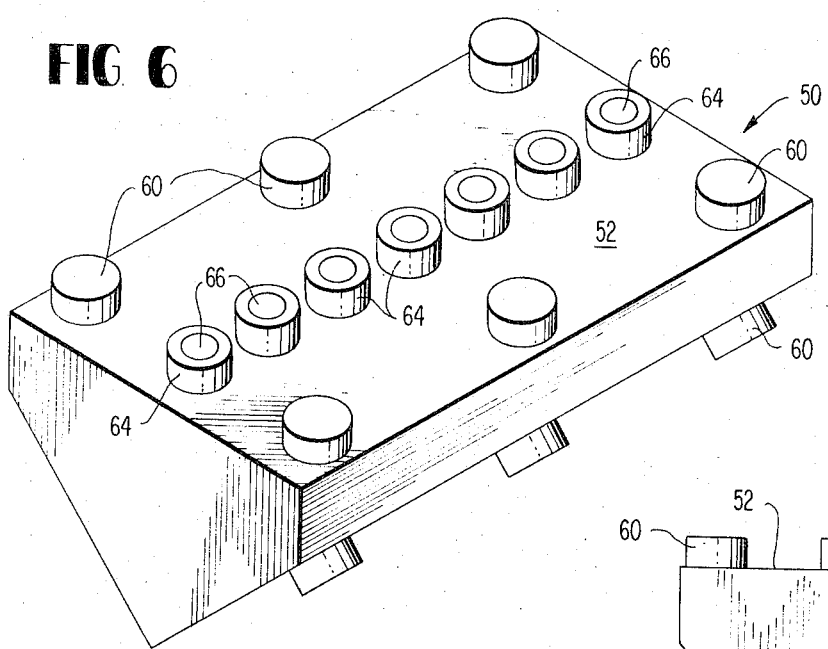
FIG. 6 is a perspective view, similar to FIG. 3, and illustrating an alternate fixture suitable for carrying out the method of the invention.
Figure 7:
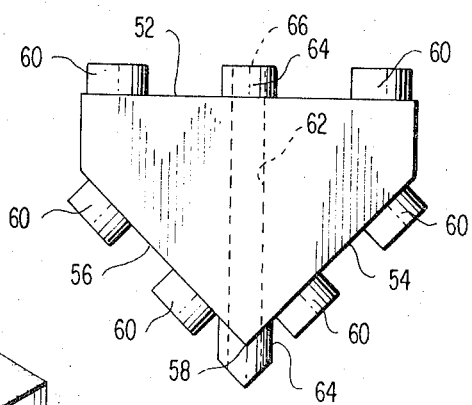
FIG. 7 is an end elevation view of the fixture shown in FIG. 6.

Referring now to FIGS. 6-9, alternate fixtures employed to mount the laser rod blanks will be described in detail. The fixture illustrated in FIGS. 6 and 7 is employed to finish one end surface in a plane perpendicular to the rod axis and the other end in two surfaces disposed at an angle with respect to one another and with respect to the first end surface. The fixture is designated generally by the reference numeral 50, and comprises a solid block of aluminum having a top flat surface 52 and bottom surfaces 54, 56 disposed at right angles to one another and at 45° angles with respect to surface 52. Angled surfaces 54, 56 meet at a vertex 58 extending along the longitudinal center line of the fixture 50. A plurality of glass feet 60 are mounted, at spaced intervals, on the surfaces 52, 54, and 56, with these glass feet serving essentially the same functions as the glass feet 30 employed on fixture 10. A plurality of bores 62 extend through fixture 50, perpendicular to surface 52, and with their axes intersecting the vertex 58 of surfaces 54, 56. Glass sleeves 64 are mounted on the ends of laser rod blanks 66 in the same manner and for the same purpose as described above with regard to the embodiment illustrated in FIGS. 1-5.

Figure 8:
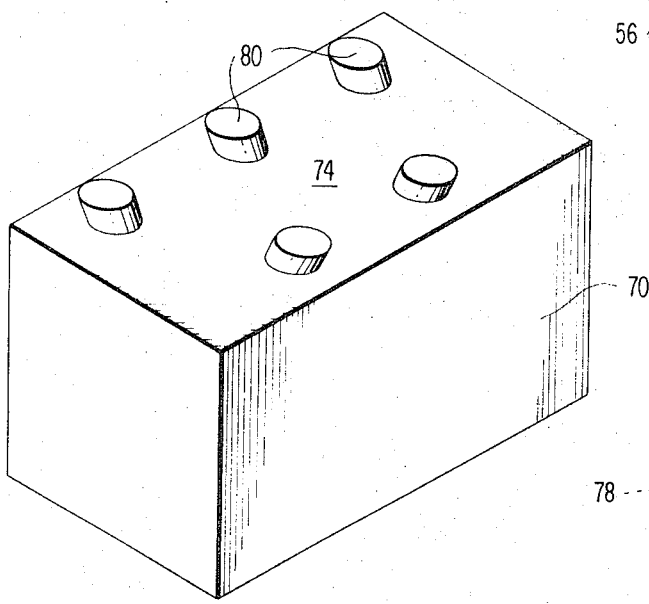
FIG. 8 is a perspective view of a further fixture suitable for carrying out the method of the invention.
Figure 9:
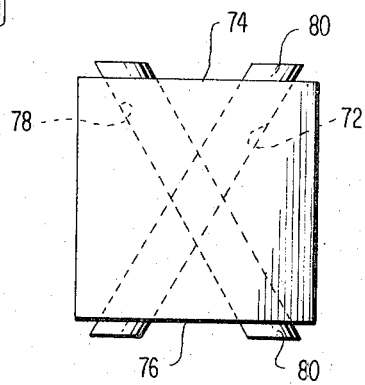
FIG. 9 is an end elevation view of the fixture shown in FIG. 8.

The embodiment of a fixture illustrated in FIGS. 8 and 9, indicated by the reference numeral 70, is intended for use in those instances wherein the opposed end surfaces of the respective laser rods are parallel, but disposed at an angle with respect to the longitudinal axis of the rod. Thus, the solid body of the fixture 70 has a first row of bores 72 extending therethrough from the parallel upper and lower surfaces 74, 76, respectively, with the axes of the bores being disposed at an angle with respect to the parallel surfaces. A second set of bores 78 extend through the fixture from surfaces 74, 76 and are inclined thereto at an angle complementary to the angle of the bores 72. For the sake of simplicity of illustration, the glass feet employed on surfaces 74 and 76, and the glass sleeves employed on the laser rod blanks 80 (mounted in bores 72 and 78) have been omitted from FIGS. 8 and 9. These elements would, of course, be added when employing this fixture in the practice of the method according to this invention.

The fixtures illustrated in FIGS. 6–9 and described above differ from the fixture illustrated in FIGS. 1–5 primarily in the fact that the glass feet are not positioned on an overhanging surface to facilitate measurement of the height by micrometer calipers. However, the fixtures are otherwise used to finish the laser rods in exactly the same manner, and the glass feet in every case serve the important function of providing additional glass area adjacent the periphery of the bundle of rods being finished to increase the accuracy in angular orientation (parallelism) of the end surfaces and by providing convenient reference bench marks for measuring rod length and end surface "parallelism."

While various configurations of the mounting and finishing fixture have been illustrated and described, others capable of producing any desired end surface configuration should be readily apparent. Thus, while I have illustrated and described preferred embodiments of my invention, I wish it understood that I do not intend to be restricted solely thereto, but that I do intend to include all embodiments thereof which would be apparent to one skilled in the art and which come within the spirit and scope of my invention.

I claim:

1. In the method of finishing laser rods wherein an end surface of a laser rod blank is ground and polished to produce the required angular orientation and degree of flatness on said end surface, the improvement which comprises the steps of securing a laser rod blank in a rigid fixture with one end of said laser rod blank projecting outwardly from a planar surface of the fixture and having its longitudinal axis disposed at an angle with respect to said planar surface corresponding to a predetermined angular orientation of said axis relative to the finished end surface to be produced on said laser rod blank, releasably mounting a glass sleeve on the outer surface of said one end of said laser rod blank, mounting a plurality of glass feet on said planar surface at points spaced from said laser rod blank and from one another, and simultaneously finishing said one end of said laser rod blank, said glass sleeve and said glass feet in a plane parallel to said planar surface.

2. The method of finishing laser rods defined in claim 1 further comprising the step of measuring the finished height of each of said plurality of glass feet from said planar surface as a means of determining the preciseness of the surface finish applied to said laser rod blank.

3. The method of finishing laser rods defined in claim 1 wherein said laser rod blank is mounted in said rigid fixture with each opposite axial end thereof projecting outwardly from one of a pair of planar surfaces of said fixture with the longitudinal axis thereof disposed at an angle with respect to each of said pair of planar surfaces, mounting a plurality of glass feet on each said planar surface at points spaced from said laser rod blank, releasably mounting a glass sleeve on the outer surface of each said opposite axial end of said laser rod blank, first finishing one end of said laser rod blank by simultaneously finishing said one end, said glass sleeve on said one end and said glass feet mounted on the surface adjacent thereto, and then finishing the other end of said laser rod blank by simultaneously finishing said other end, said glass sleeve on said other end and said glass feet mounted on the other of said planar surfaces.

4. The method of finishing laser rods defined in claim 3 wherein said pair of planar surfaces are mutually parallel.

5. The method of finishing laser rods defined in claim 3 wherein said pair of planar surfaces are mutually non-parallel.

6. In the art of finishing laser rods wherein opposed ends of the rods are ground and polished to precision tolerances with respect to the length of the rods and with respect to the flatnesss and parallelism of the end surfaces, the improvement comprising the steps of securing a plurality of elongated rod blanks one in each of a plurality of parallel spaced openings in a rigid fixture, releasably securing the rods in position within said fixture by use of an adhesive material with the exposed ends of the rods projecting outwardly from opposed generally parallel surfaces of said fixture and with the corresponding ends of the respective rods substantially disposed in a common plane, grinding the ends of the rods projecting from said fixture in a plane parallel to the adjacent surface thereof to produce a rod having a length slightly greater than the high tolerance length of the polished rods, simultaneously finishing all of the rod ends projecting from one of said planar surfaces by hand lapping the rod ends using progressively finer abrasive material until the rod ends are flat, parallel and polished within the degree of tolerance required, repeating the hand lapping and finishing operations on the other ends of the rods until the rod ends are flat, parallel and polished and the length of the rods are within the degree of tolerance required, and removing the finished rods from the fixture.

7. The method of finishing laser rods defined in claim 6 further comprising the steps of releasably securing a glass sleeve on the outer surface of the ends of each said laser rod blank prior to said grinding and lapping operations whereby the glass sleeves and rod ends are simultaneously finished to thereby minimize rod chipping and edge roll during the finishing operations.

8. The method defined in claim 7 further comprising the steps of mounting a plurality of glass feet on each of said parallel surfaces, at spaced points thereover, and simultaneously grinding and lapping said glass feet on each said surface as the laser rod ends projecting therefrom are finished.

9. The method of finishing laser rods as defined in claim 8, further comprising the steps of periodically measuring and comparing the height of the glass feet projecting from said parallel surfaces during the finishing operation to determine the length of said laser rods and to indicate the degree of parallelism of said rod end surfaces.

10. A rigid metal fixture for use in finishing laser rod end surfaces comprising a body, a pair of spaced apart planar surfaces on said body, a plurality of spaced parallel bores formed in and extending through said body and in which to accommodate a like plurality of laser rod blanks in slip fit relationship, sais bores each having a terminal end opening communicating with each said planar surface and having its longitudinal axis disposed at a predetermined angle with respect to each of said planar surfaces and therewith defining by such angle the angular planar surface orientation impartable to the end surfaces of said laser rods, and a plurality of glass discs projecting from each of said pair of planar surfaces at mutually spaced locations and laterally spaced from said bore openings.

11. The fixture defined in claim 10 wherein said planar surfaces are mutually parallel, and said fixture further comprises a groove formed in said body between said mutually parallel planar surfaces to define an overhanging flange extending around said fixture at the peripheral edge of each said planar surface.

12. The fixture defined in claim 10 wherein said glass discs are located on said planar surfaces adjacent the peripheral edge thereof and define bench mark reference surfaces from which to reference the preciseness of laser rod finishing operations.

13. The fixture defined in claim 10 wherein said planar surfaces are mutually non-parallel.

14. In the method of finishing laser rods wherein the ends of laser rod blanks are ground and polished to produce the desired length of rod and to produce the required angular orientation and degree of flatness of the end surfaces thereof, the improvement comprising the steps of releasably mounting said laser rod blanks in a rigid fixture with each end of said laser rod blanks projecting outwardly from a planar surface of said fixture, mounting a removable tubular sleeve of glass on said ends of said laser rod blanks, simultaneously finishing said ends and said tubular sleeves mounted thereon, and removing said sleeves from the resultant finished laser rods.

* * * * *

UNITED STATES PATENT AND TRADEMARK OFFICE
CERTIFICATE OF CORRECTION

PATENT NO. : 3,868,794
DATED : March 4, 1975
INVENTOR(S) : Wayne J. Zitkus

It is certified that error appears in the above-identified patent and that said Letters Patent are hereby corrected as shown below:

Col. 2, line 62, "mainted" should be --maintained--; Col. 3, line 37, "illustraed" should be --illustrated--; line 57, "sequences" should be --squareness--; Col. 7, line 6, "sais" should be --said--.

Signed and Sealed this

Fifth Day of April 1977

[SEAL]

Attest:

RUTH C. MASON
Attesting Officer

C. MARSHALL DANN
Commissioner of Patents and Trademarks